(12) United States Patent
Numao et al.

(10) Patent No.: US 10,803,075 B2
(45) Date of Patent: *Oct. 13, 2020

(54) SYSTEM AND METHOD FOR SEARCHING A DATABASE OR DATA SHARING SYSTEM FOR THE PRESENCE OF DATA

(71) Applicant: International Business Machines Corporation, Armonk, NY (US)

(72) Inventors: Masayuki Numao, Kawasaki (JP); Yuji Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/017,190

(22) Filed: Sep. 3, 2013

(65) Prior Publication Data
US 2014/0006445 A1 Jan. 2, 2014

Related U.S. Application Data

(63) Continuation of application No. 10/421,256, filed on Apr. 22, 2003, now Pat. No. 8,538,937.

(51) Int. Cl.
*G06F 16/00* (2019.01)
*G06F 16/30* (2019.01)
(Continued)

(52) U.S. Cl.
CPC ........ *G06F 16/2471* (2019.01); *G06F 16/951* (2019.01)

(58) Field of Classification Search
CPC .............. G06F 16/2471; G06F 16/951
See application file for complete search history.

(56) References Cited

U.S. PATENT DOCUMENTS 5,884,272 A 3/1999 Walker et al.
6,148,342 A * 11/2000 Ho ................................. 709/225
(Continued)

FOREIGN PATENT DOCUMENTS

| JP | 11-259512 | 9/1999 |
| JP | 2002-176339 | 6/2002 |
| JP | 2004-021654 | 1/2004 |

OTHER PUBLICATIONS

Moni Naor, Benny Pnkes. "Oblivious transfer and polynomial evaluation," Proceedings of the 31st Annual ACM Symposium on Theory of Computing, p. 245-254, May 1-4, 1999, Atlanta, Georgia, United States.*

(Continued)

*Primary Examiner* — Usmaan Saeed
*Assistant Examiner* — Paul Kim
(74) *Attorney, Agent, or Firm* — Konrad Raynes Davda & Victor LLP; Janaki K. Davda

(57) ABSTRACT

A database search system ensures the privacy of a search request and the security of a database with high processing efficiency. The system comprises a database server residing on a network that stores predetermined data, and a client terminal issuing to the database server a search request for inquiring for desired data while keeping the desired data secret. The database server further comprises: a database storing predetermined data; and a search response message generation unit for receiving through a network the data search request in which data to be searched for is kept secret, searching the database by a predetermined computation based on the search request and a list of the data stored in the database while a data item involved with the search request is kept secret, and generating a response to the search request.

9 Claims, 8 Drawing Sheets

(51) Int. Cl.
*G06F 16/2458* (2019.01)
*G06F 16/951* (2019.01)

(56) References Cited

U.S. PATENT DOCUMENTS

| | | | |
|---|---|---|---|
| 6,167,392 | A | 12/2000 | Ostrovsky et al. |
| 6,216,128 | B1 | 4/2001 | Di-Crescenzo et al. |
| 6,405,245 | B1 | 6/2002 | Burson et al. |
| 6,865,575 | B1 | 3/2005 | Smith et al. |
| 6,871,220 | B1 | 3/2005 | Rajan et al. |
| 6,922,696 | B1 | 7/2005 | Lincoln et al. |
| 7,028,062 | B2 | 4/2006 | Kanasugi et al. |
| 7,127,670 | B2 | 10/2006 | Bendik |
| 8,538,937 | B2 | 9/2013 | Numao et al. |
| 2002/0027567 | A1 | 3/2002 | Niamir |
| 2003/0115202 | A1* | 6/2003 | Jackson, Jr. ...... G06F 17/30545 |
| 2003/0120734 | A1 | 6/2003 | Kagan et al. |
| 2004/0003254 | A1* | 1/2004 | Numao ............... H04L 63/0428 |
| | | | 713/177 |
| 2004/0034628 | A1 | 2/2004 | Numao et al. |

OTHER PUBLICATIONS

Fagin et al., "Comparing Information Without Leaking It", Communications of the ACM, vol. 39/5, pp. 77-85, May 1996.
Naor et al., "Oblivious Transfer and Polynomial Evaluation", 31st ACM STOC Atlanta GA, pp. 245-254, May 1999.
Naor et al., "Privacy Preserving Auctions and Mechanism Design", ACM CEC 1999.
Naor et al., "Distributed Oblivious Transfer", Asiacrypt 2000.
Lindell et al., "Privacy Preserving Data Mining", Journal of Cryptology, vol. 1513, pp. 177-206, Sum 2002.
English abstract of Japanese Office Action dated Jun. 6, 2006 for Japanese Publication No. 2002-176339.
Notice of Allowance, dated May 13, 2013, for U.S. Appl. No. 10/421,256, filed Apr. 22, 2003 by M. Numao et al., Total 8 pp.
English Abstract, Jun. 21, 2002 for Japanese Publication No. 2002-176339, Total 2 pp.
Office Action 1, dated Nov. 7, 2005, for U.S. Appl. No. 10/421,256, filed Apr. 22, 2003 by M. Numao et al., Total 16 pp.
Response to Office Action 1, dated Feb. 7, 2006, for U.S. Appl. No. 10/421,256, filed Apr. 22, 2003 by M. Numao et al., Total 11 pp.
Final Office Action, dated Apr. 19, 2006, for U.S. Appl. No. 10/421,256, filed Apr. 22, 2003 by M. Numao et al., Total 15 pp.
Response to Final Office Action, dated Jul. 18, 2006, for U.S. Appl. No. 10/421,256, filed Apr. 22, 2003 by M. Numao et al., Total 17 pp.
Office Action 3, dated Oct. 24, 2006, for U.S. Appl. No. 10/421,256, filed Apr. 22, 2003 by M. Numao et al., Total 9 pp.
Response to Office Action 3, dated Jan. 23, 2007, for U.S. Appl. No. 10/421,256, filed Apr. 22, 2003 by M. Numao et al., Total 16 pp.
Reply to Disclosure Requirement, Jun. 21, 2007, for U.S. Appl. No. 10/421,256, filed Apr. 22, 2003 by M. Numao et al., Total 2 pp.

Final Office Action 2, dated Sep. 10, 2007, for U.S. Appl. No. 10/421,256, filed Apr. 22, 2003 by M. Numao et al., Total 14 pp.
Response to Final Office Action 2, dated Oct. 25, 2007, for U.S. Appl. No. 10/421,256, filed Apr. 22, 2003 by M. Numao et al., Total 14 pp.
Office Action 5, dated Jan. 9, 2008, for U.S. Appl. No. 10/421,256, filed Apr. 22, 2003 by M. Numao et al., Total 5 pp.
Response to Office Action 5, dated Apr. 9, 2008, for U.S. Appl. No. 10/421,256, filed Apr. 22, 2003 by M. Numao et al., Total 8 pp.
Final Office Action 3, dated Aug. 6, 2008, for U.S. Appl. No. 10/421,256, filed Apr. 22, 2003 by M. Numao et al., Total 5 pp.
Response to Final Office Action 3, dated Sep. 22, 2008, for U.S. Appl. No. 10/421,256, filed Apr. 22, 2003 by M. Numao et al., Total 8 pp.
Response to Final Office Action 3, dated Sep. 26, 2008, for U.S. Appl. No. 10/421,256, filed Apr. 22, 2003 by M. Numao et al., Total 8 pp.
Advisory Action, dated Sep. 30, 2008, for U.S. Appl. No. 10/421,256, filed Apr. 22, 2003 by M. Numao et al., Total 3 pp.
Office Action 7, dated Dec. 23, 2008, for U.S. Appl. No. 10/421,256, filed Apr. 22, 2003 by M. Numao et al., Total 6 pp.
Response to Office Action 7, dated Mar. 4, 2009, for U.S. Appl. No. 10/421,256, filed Apr. 22, 2003 by M. Numao et al., Total 8 pp.
Final Office Action 4, dated Jun. 24, 2009, for U.S. Appl. No. 10/421,256, filed Apr. 22, 2003 by M. Numao et al., Total 7 pp.
Response to Final Office Action 4, dated Nov. 17, 2009, for U.S. Appl. No. 10/421,256, filed Apr. 22, 2003 by M. Numao et al., Total 8 pp.
Office Action 9, dated Jul. 29, 2010, for U.S. Appl. No. 10/421,256, filed Apr. 22, 2003 by M. Numao et al., Total 7 pp.
Response to Office Action 9, dated Oct. 26, 2010, for U.S. Appl. No. 10/421,256, filed Apr. 22, 2003 by M. Numao at al., Total 13 pp.
Final Office Action 5, dated Jan. 3, 2011, for U.S. Appl. No. 10/421,256, filed Apr. 22, 2003 by M. Numao et al., Total 11 pp.
Response to Final Office Action 5, dated Mar. 2, 2011, for U.S. Appl. No. 10/421,256, filed Apr. 22, 2003 by M. Numao et al., Total 14 pp.
Advisory Action 2, dated Mar. 11, 2011, for U.S. Appl. No. 10/421,256, filed Apr. 22, 2003 by M. Numao et al., Total 3 pp.
Office Action 11, dated May 18, 2011, for U.S. Appl. No. 10/421,256, filed Apr. 22, 2003 by M. Numao et al., Total 9 pp.
Response to Office Action 11, dated Oct. 19, 2011, for U.S. Appl. No. 10/421,256, filed Apr. 22, 2003 by M. Numao et al., Total 13 pp.
Final Office Action 6, dated Jan. 26, 2012, for U.S. Appl. No. 10/421,256, filed Apr. 22, 2003 by M. Numao et al., Total 9 pp.
Response to Final Office Action 6, Mar. 26, 2012, for U.S. Appl. No. 10/421,256, filed Apr. 22, 2003 by M. Numao et al., Total 9 pp.
Advisory Action 3, dated Apr. 5, 2012, for U.S. Appl. No. 10/421,256, filed Apr. 22, 2003 by M. Numao et al., Total 4 pp.
U.S. Pat. No. 7,028,062, dated Apr. 11, 2006, is an English language equivalent of JP2002-176339, dated Jun. 21, 2002.

* cited by examiner

SYSTEM AND METHOD FOR SEARCHING A DATABASE OR DATA SHARING SYSTEM FOR THE PRESENCE OF DATA

CROSS-REFERENCE TO RELATED APPLICATIONS

Under 35 U.S.C. 120, this application is a Continuation Application and claims priority to U.S. application Ser. No. 10/421,256, filed Apr. 22, 2003, entitled "METHOD FOR SEARCHING A DATABASE OR DATA SHARING SYSTEM FOR THE PRESENCE OF DATA," which claims the priority of Japanese patent application, Serial No. JP2002-176339, filed Jun. 17, 2002, entitled "DATABASE SEARCH SYSTEM, DATA SHARING SYSTEM, AND DATA SEARCH METHOD FOR THEM," all of which are incorporated herein by reference.

FIELD OF THE INVENTION

The present invention generally relates to a database search system, and more particularly to a system for performing a search to determine whether a certain database stores particular data of interest.

BACKGROUND OF THE INVENTION

One of the services provided on a network is a data search service for data stored in a database. A client who wants to use the database sends a search request (query) to a database server on the network to inquire whether a desired data is in the database and receives a search result in response to the query.

In such use of the database, a search may be desired only to determine whether the database stores a particular data or not. In this case, the database server replies to the search request by returning information on the presence or absence of the requested data, rather than returning the data itself. In an exemplary situation, a user may wish to determine which technical database stores particular technical information among a plurality of technical databases. If any technical database is found to store the desired data, another request may be made for transmission of the data from that technical database storing the data.

This search approach poses some concerns: the privacy of the search request of the client at the system sending the search request, and the security of the database.

The user may not wish the details of the search request available to unauthorized persons. The search request contains information on the user's interest. For example, a company may search a technical database of a competitor. Revealing the details of that search to the competitor, such as the type of technique the company is researching, can pose a significant problem, possibly exposing the company's business strategy. On the other hand, an open database shared among companies of the same trade leads to a vigorous industry. Therefore, it would be extremely useful if a database of the competitor can be searched while the content of a search request is kept secret.

In addition, the owner of the database may wish to maintain data and database security. For example, some systems charge for data retrieval from a database. In such systems, charging for the data would be meaningless if unlimited amounts of data could be retrieved from the database in one search. Even in charge-free systems, it is desirable to avoid providing a user with excess search results, because the database itself contains information on interests or strategies of the database owner.

Several protocols have been proposed to address the issues of database access and security.

To perform a database search while hiding a list $L_i$ of data stored in a database and the value $\alpha$ of a data number to be searched for, one method uses a one-way hash function H. FIG. 8 describes this conventional method. Suppose that a database server $S_i$ hides a list $L_i = \{x_{i,0}, \ldots, x_{i,n-1}\}$ from a client A, and the client A hides $\alpha$. The database server $S_i$ then provides $L'_i = \{H(x_{i,0}), \ldots, H(x_{i,n-1})\}$ to the client A, and the client A checks whether any one matches $H(\alpha)$, where $H(\cdot)$ is a one-way hash function. In this case, neither the client A nor the database server $S_i$ needs to disclose the data numbers.

Another method as described by Naor, M. and Pinkas, B., "Oblivious Transfer and Polynomial Evaluation," Proc. of STOC '99, uses Oblivious Polynomial Evaluation (abbreviated as OPE hereafter). This is a protocol characterized in that only a result of substituting an input into a function is received while the input is hidden.

More specifically, this method is characterized as follows. A recipient A has a secret value $\alpha$, and a sender B has a secret polynomial $f(x)$. The recipient A can know a polynomial $f(\alpha)$ by the OPE protocol, but obtain no information on $f(\beta)$ for inputs $\beta(\neq \alpha)$ other than $\alpha$. On the other hand, the sender B cannot know $\alpha$ even after execution of the OPE protocol.

FIG. 9 describes a conventional method using OPE. First, a client A and a database server $S_i$ choose random n-order polynomials $f_A(x)$ and $f_{Si}(x)$, respectively. The client A obtains $f_{Si}(\alpha)$ from the database server $S_i$ by OPE. The database server $S_i$ obtains $f_A(x_{i,0}), \ldots, f_A(x_{i,n-1})$ by OPE. The database server $S_i$ sends $L'_i = \{f_{Si}(x_{i,0}) + f_A(x_{i,0}), \ldots, f_{Si}(x_{i,n-1}) + f_A(x_{i,n-1})\}$ to the client A. The client A can know whether $\alpha \in L_i$ by computing the following equation:

$$\tilde{\alpha} = f_{Si}(\alpha) + f_A(\alpha)$$

and verifying the following equation:

$$\tilde{\alpha} \in L'_i$$

According to this method, no excess information about $\alpha \in L_i$ is exposed.

A protocol for a special form of OPE based on the Decisional Diffie-Hellman (DDH) problem is presented in Lindell, Y. and Pinkas, B., "Privacy Preserving Data Mining," Proc. of CRYPTO2000, LNCS.

The DDH problem is a decisional problem of distinguishing between $D = \langle g, h, g^a, h^a \rangle$ (this form is called a "Diffie-Hellman tuple") and $R = \langle g, h, g^a, h^b \rangle$ with significant probability on GF(q), where g, h∈GF(q) and a, b∈Zq are randomly chosen. Algorithms for solving this problem in polynomial time in the size of q are not known. Therefore, it is often used as means of ensuring the security of cryptography. The method using OPE in this approach is different from the method described previously in that B having the polynomial $f(x)$ returns $g^{f(x)}$ (not $f(x)$ itself) for the input $\alpha$ from the client A.

Thus, search methods have been proposed in which the privacy of a search request and the security of a database are taken into consideration when a database search is requested. However, these methods present numerous disadvantages.

The conventional method using a one-way hash function allows the client A to search for unlimited different items. For example, if the client A wants to know whether $\alpha'(\neq \alpha)$ is included in the list $L_i$, the client A may simply check whether $H(\alpha') \in L'_i$. By repeating this, the client A may ultimately determine the content of the list $L_i$. That is, this method presents a problem with achieving secrecy (security) of the database.

Another conventional method using OPE requires communication in four or more passes to ensure the privacy of the search request and the security of the database, as shown in FIG. 9. Therefore, the method presents problems relating to high communication cost and complicated processing.

Thus, there is a need for a database search system and method that ensures the privacy of a search request and the security of a database with high processing efficiency. The need for such a system has heretofore remained unsatisfied.

SUMMARY OF THE INVENTION

The present invention satisfies this need, and presents a system, a computer program product, and an associated method (collectively referred to herein as "the system" or "the present system") for providing a database search system that ensures the privacy of a search request and the security of a database with high processing efficiency. To achieve the above object, the present system is provided as a database search system comprising: a database server residing on a network and storing predetermined data; and a client terminal issuing to the database server a search request for inquiring for desired data while keeping the desired data secret.

The database server comprises a database storing predetermined data and a search response message generation unit. The search response message generation unit receives through a network a data search request in which the requested data is kept secret, searches the database by a predetermined computation based on the search request and a list of the data stored in the database while a data item involved with the search request is kept secret, and generates a response to the search request.

Specifically, the search response message generation unit of the database server receives a search request for predetermined data through a network, generates a polynomial having a data item involved with the search request as a root based on the search request that contains a confidentiality request for the query and the content of the retrieved data, and a list of the data stored in the database, solves an evaluation problem in which a result of substitution of the data item into the polynomial becomes zero by Oblivious Polynomial Evaluation, and generates a response to the search request.

In one embodiment of the present system, the search response message generation unit of the database server randomly generates the polynomial using a random number.

The client terminal comprises a search request message generation unit and a search result determination unit. The search request message generation unit encrypts a data item involved with desired data and generates the search request for inquiring of the database server for the desired data. The search result determination unit for receives an evaluation result for the search request obtained by Oblivious Polynomial Evaluation from the database server and obtains information indicating whether the database server has the desired data based on the evaluation result.

The present system is also implemented as a data sharing system for sharing data in a peer-to-peer network system. The data sharing system comprises: a first peer issuing to other peers a search request for inquiring for desired data while keeping the desired data secret; and a second peer searching its database and sending an obtained search result to the first peer. The database search performed by the second peer uses a predetermined computation based on the search request received from the first peer and a list of data stored in the database; the desired data involved in the search request is kept secret.

Any peer in the peer-to-peer network may be the first peer described above. Each of other peers (usually all other peers unless otherwise limited by settings) may then be the second peer described above.

More specifically, the second peer generates a polynomial having a data item involved with the search request as a root based on the search request received from the first peer and a list of data stored in its database. The second peer then solves an evaluation problem in which a result of substitution of the data item into the polynomial becomes zero, and sends an obtained evaluation result to the first peer.

The present system is also implemented as a data search method for searching a database storing predetermined data to determine whether desired data is stored in the database. The data search method implements the following steps: generating a search request for inquiring of the database for the desired data; generating a polynomial having a data item involved with the search request as a root based on the search request and a list of the data stored in the database and solving an evaluation problem in which a result of substitution of the data item into the polynomial becomes zero; and obtaining information indicating whether the database stores the desired data based on an evaluation result.

Another data search method of the present system implements the following steps: encrypting a data item involved with desired data using a first key and generating a search request for inquiring of the database for the desired data; performing a database search by a predetermined computation based on the search request and a list of the data stored in the database while the desired data involved in the search request is kept secret; and based on a result of the database search, obtaining information indicating whether the database stores the desired data by a predetermined computation using a second key corresponding to the first key.

The present system may also be implemented as a program for controlling a computer so that the computer functions as the above described database server or client terminal (terminal device). The program may be stored in and distributed as a magnetic disk, optical disk, semiconductor memory, or other storage media, or distributed through a network.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
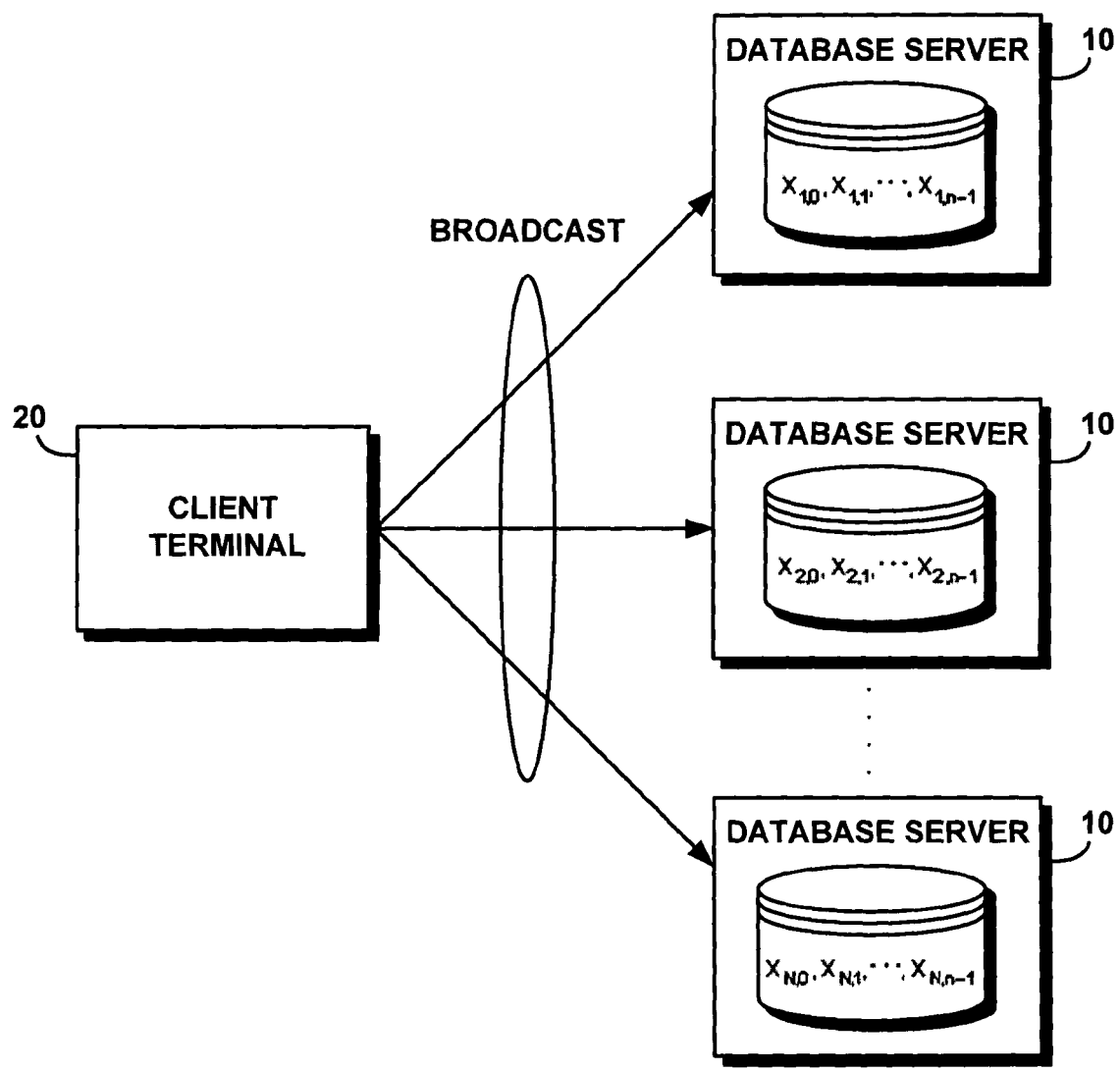
FIG. 1 is a schematic illustration of an exemplary operating environment in which a database search system of the present invention can be used.

FIG. 1 portrays an exemplary overall environment in which a system and method for searching a database or data sharing system for existence of data (alternatively referenced as the database searching system) according to the present invention may be used. The database searching system includes a software programming code or computer program product that is typically embedded within, or installed on a computer such as a host server. Alternatively, the database searching system can be saved on a suitable storage medium such as a diskette, a CD, a hard drive, or like devices. The database search system in this embodiment comprises database servers 10 and a client terminal 20.

The database servers 10 are servers that provide a search service of data stored in databases through a network.

The client terminal 20 is a terminal device used by a client of the service provided by the database servers 10. The client terminal 20 issues a search request to the database servers 10 for inquiring whether the database servers 10 have desired data.

In this embodiment, the database servers 10 are implemented as workstations, personal computers, or other computers with network capability. The client terminal 20 is implemented as a workstation, a personal computer, a PDA (Personal Digital Assistant), or other information processing devices with network capability. The database servers 10 and the client terminal 20 exchange messages through a network (not shown). The network communication line may be either wired or wireless.

As shown, this embodiment involves N database servers 10 to which the client terminal 20 broadcasts the search request. Consequently, each database server 10 is referred to with an index 1 to N as needed, such as the database servers 101, . . . , 10N. The database servers 101, . . . , 10N may also be collectively referenced as the database server 10*i* (1≤i≤N).

Figure 7:
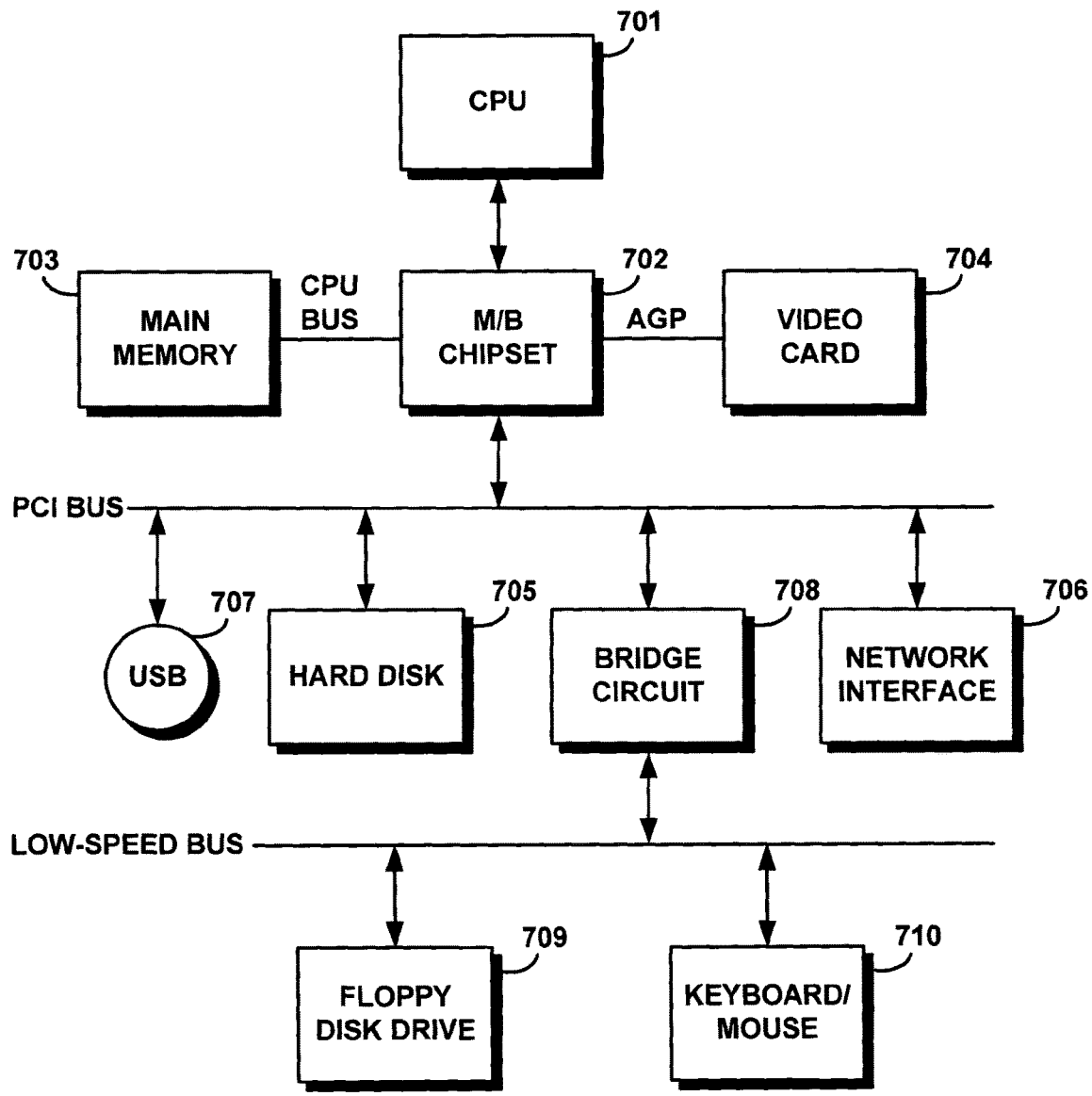
FIG. 7 is a schematic diagram showing an exemplary hardware configuration of a computer suitable for implementing the database server and the client terminal according to the database search system of FIGS. 1 and 2.
Figure 8:
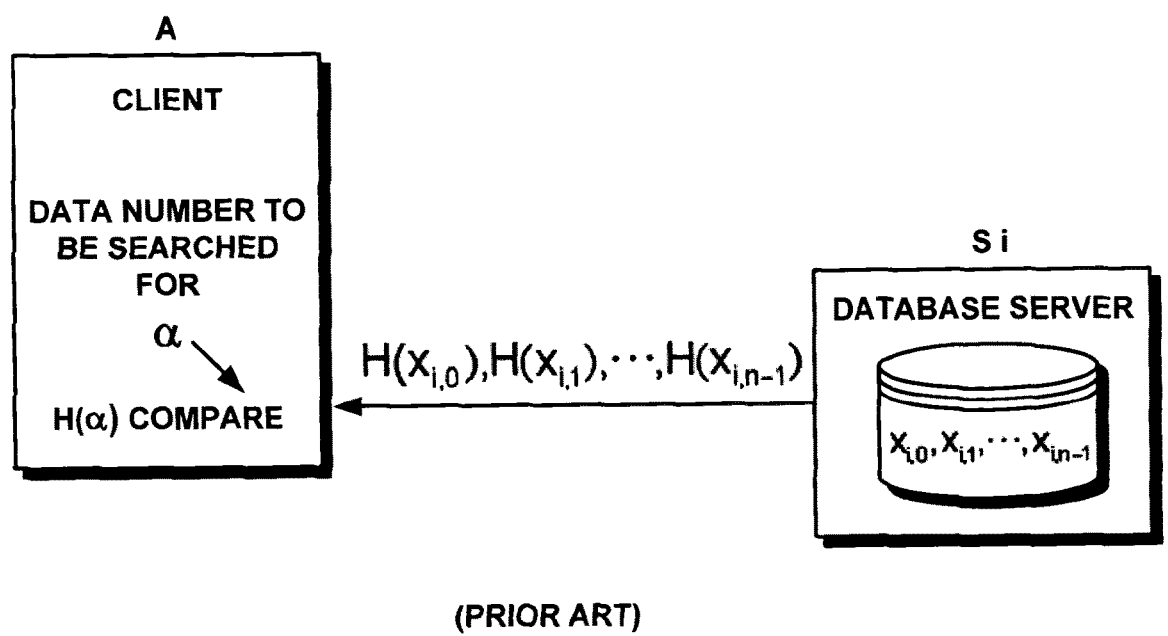
FIG. 8 is a diagram illustrating a prior art database search method using a one-way hash function.
Figure 9:
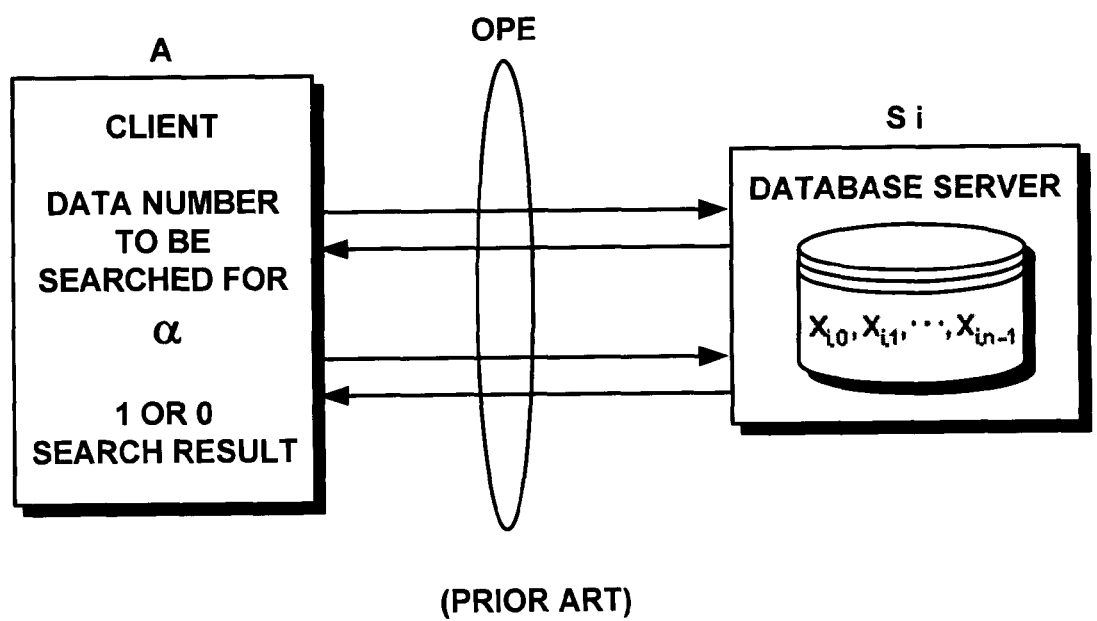
FIG. 9 is a diagram illustrating a prior art conventional database search method using an OPE protocol.

FIG. 7 is a schematic diagram of an exemplary hardware configuration of a computer suitable for implementing the database server 10*i* and the client terminal 20 according to this embodiment.

The computer comprises a CPU (Central Processing Unit) 701 as operation means; main memory 703 connected to the CPU 701 via a M/B (motherboard) chipset 702 and a CPU bus; a video card 704 also connected to the CPU 701 via the M/B chipset 702 and an AGP (Accelerated Graphics Port); a hard disk 705, a network interface 706, and a USB port 707 connected to the M/B chipset 702 via a PCI (Peripheral Component Interconnect) bus; and a floppy disk drive 709 and a keyboard/mouse 710 connected to the M/B chipset 702 via the PCI bus over a bridge circuit 708 and a low-speed bus such as an ISA (Industry Standard Architecture) bus.

FIG. 7 is a mere illustration of a hardware configuration of a computer for realizing this embodiment; various other configurations to which this embodiment can be applied may also be employed. For example, only video memory may be provided instead of the video card 704, in which case the CPU 701 processes image data. Further, a CD-ROM (Compact Disc Read Only Memory) driver or a DVD-ROM (Digital Versatile Disc Read Only Memory) driver may be provided via an interface such as ATA (AT Attachment).

Figure 2:
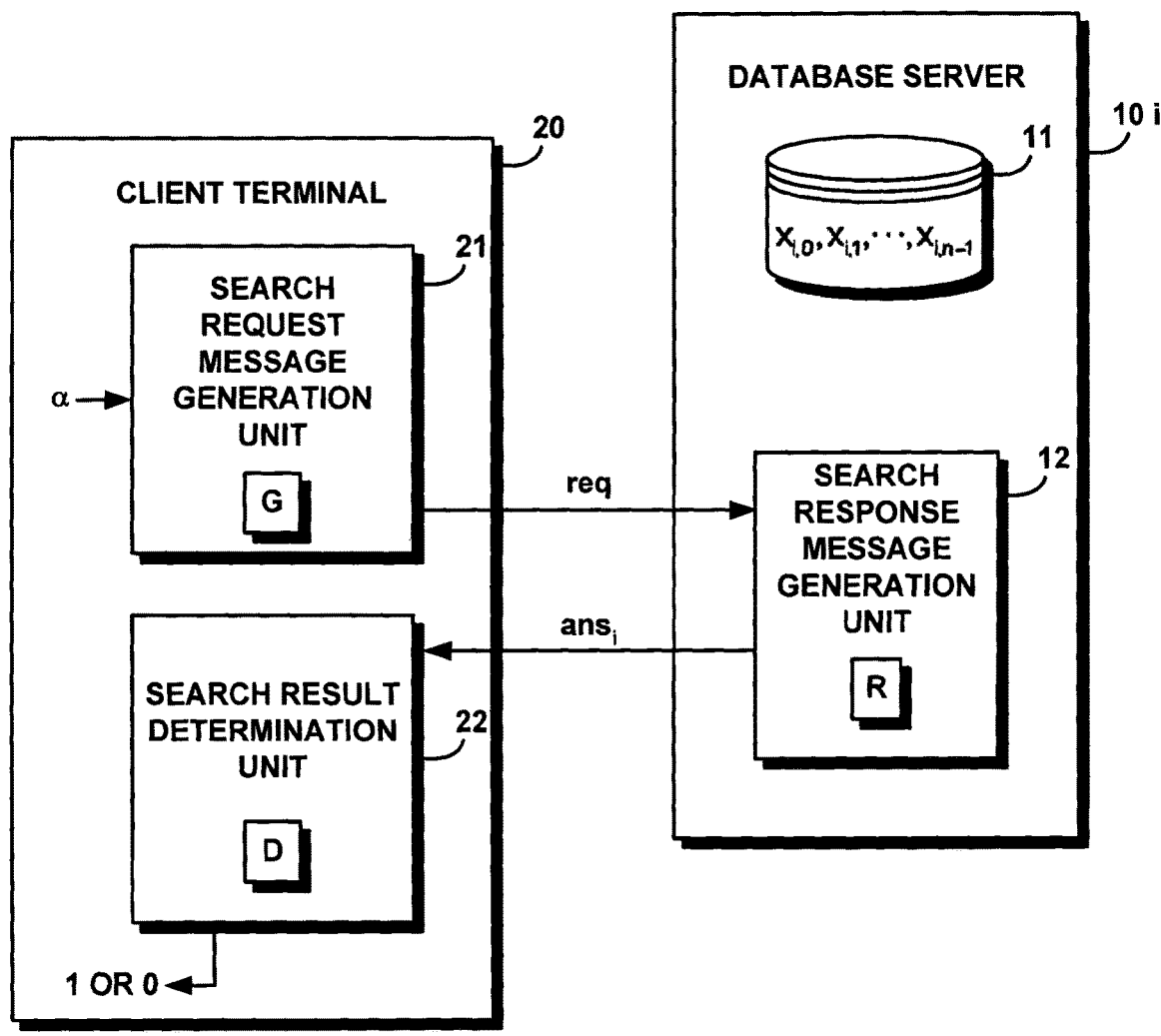
FIG. 2 is a schematic illustration of the high-level architecture of the database server and a client terminal utilizing the database search system of FIG. 1.

FIG. 2 shows a configuration of the database server 10*i* and the client terminal 20 in this embodiment.

The client terminal 20 comprises a search request message generation unit 21 for generating a search request message req from a data number α. The data number α is a search item (a number applied to data owned by the database server 10). The search request message generation unit 21 uses a search request message generation algorithm G to be described below.

The client terminal 20 also comprises a search result determination unit 22 for outputting a value of 1 or 0 as a search result based on a search response message $ans_i$ from the database server 10*i* using a search result determination algorithm D, also described below. The search request message generation unit 21 and the search result determination unit 22 are virtual software blocks provided by a program-controlled CPU in the information processing device that embodies the client terminal 20.

Although not shown, the client terminal 20 includes a transceiver means provided by the program-controlled CPU and by a network interface. The program that controls the CPU may be stored in and distributed as a magnetic disk, optical disk, semiconductor memory, or other storage media, or distributed through a network.

The database server 10*i* comprises a database 11 and a search response message generation unit 12. The search response message generation unit 12 generates the search response message $ans_i$ based on the search request message, req, and a list of data stored in the database 11 using a search response message generation algorithm R, which will be described below.

The database 11 is provided in a storage device (such as a magnetic disk or an optical disk) of the computer that embodies the database server 10. The search response message generation unit 12 is a virtual software block provided by a program-controlled CPU in the computer. Although not shown, the database server 10*i* includes a transceiver means provided by the program-controlled CPU and by a network interface. The program that controls the CPU may be stored in and distributed as a magnetic disk, optical disk, semiconductor memory, or other storage media, or distributed through a network.

A list search (database search) according to this embodiment is formulated as follows.

A set of the database servers 10*i* (called a server set hereafter) is represented as S={101, . . . , 10N}. Each of the database servers 101, . . . , 10N has n data items in the database. A unique data number is applied to each data item. A set of all data numbers is represented as L. A list of data numbers of n data items stored in the database 11 is represented as $L_i = \{x_i, 0, \ldots, x_i, n-1\}$.

The database searching system comprises a search request message generation algorithm, G(α), a search response message generation algorithm, R(req, $L_i$), and a search result determination algorithm, D($ans_i$). The search request message generation algorithm, $G(\alpha)$, receives an input of the data number $\alpha(\in L)$ and outputs the search request message req. The search response message generation algorithm, $R(req, L_i)$, receives inputs of the search request message req and the list $L_i$ stored in the database 11, outputting the search response message $ans_i$. The search result determination algorithm, $D(ans_i)$ receives an input of the search response message $ans_i$ and outputs a search result $\{0, 1\}$. Where $req=G(\alpha)$ and $ans_i=R(req, L_i)$, 1 is output if $\alpha \in L_i$; otherwise, 0 is output.

The "list search" addressed by this embodiment of the database searching system is formulated by generating and transmitting the search request message, generating and transmitting the search response message, and determining the search result. The client terminal 20 generates the search request message, selecting the data number $\alpha \in L$ of desired data targeted by the search. The client terminal 20 generates the search request message $req=G(\alpha)$ for searching for $\alpha$ using the search request message generation algorithm G and sends the search request message req to the entire server set S.

The database server 10$i$ generates and transmits the search response message. Each of the database servers 101, . . . , 10N receives the search request message req and performs the following processing. The database server 10$i$ generates the search response message $ans_i=R(req, L_i)$ from the search request message req and the list $L_i$ using the search response message generation algorithm R, and sends the search response message $ans_i$ to the client terminal 20.

The client terminal 20 determines the search result. The client terminal 20 receives the search response message $ans_i$ and obtains $res_i=D(ans_i)$ using the search result determination algorithm D.

This embodiment of the database searching system provides the search request message generation algorithm G, the search response message generation algorithm R, and the search result determination algorithm D of the "list search" that meets the following conditions:

any database server 10$i$ can obtain no information on the data number $\alpha$ of desired data targeted by the search from the search request message $req=G(\alpha)$;

the client terminal 20 can obtain no information from the search response message $ans_i$ sent by the database server 10$i$ as a response to the search request message $req=G(\alpha)$ on whether $\alpha \in L_i$ holds; and the size of the search request message req is independent of the number N of the database servers 10$i$ that receive the search request.

The "list search" that meets these characteristics is called a "secret list search with the secret search request."

The first condition above prevents the database server 10$i$ from knowing, from the search request message, information on which data number is targeted by for the search by the client terminal 20. This condition is necessary for protecting the privacy of the client terminal 20. The second condition above prevents the client terminal 20 from obtaining excess information on the list in the database server 10$i$. This condition is necessary for the secrecy of the database in the database server 10$i$. The third condition above improves efficiency.

The nature of the list search requires that the client terminal 20 query many database servers 10$i$ on the network to locate a database server 10$i$ having a data item that matches the data number that the client terminal 20 desires. When the size of the search request message is independent of the number of the database servers 10$i$, the search request message can be sent to numerous database servers 10$i$. Therefore, the third condition above is a characteristic strongly desired in view of service scalability.

This embodiment of the database searching system satisfies all conditions described above and provides the "secret list search with the secret search request". The following parameters are used by the database searching system in this embodiment: large prime numbers p and q that meet q|p−1; and an element g of order q in a finite field $Z_p$. The size of p and q is set such that the discrete logarithm problem for a group GF (q) formed with g as a generator is difficult in terms of computational complexity.

Further, all operations are performed in mod p unless otherwise stated. Besides the formation in a prime field of order p, the formation contemplated in the database searching system is also defined for any group GF (q) such that the discrete logarithm problem is difficult in terms of computational complexity.

For example, the formation may be a group formed by letting multiplication operations in a prime field of order p correspond to addition operations on a curve such as an elliptic curve over a certain finite field. Alternatively, the formation may be a group formed by replacing the prime number p with a number of powers of a prime number p', and replacing remainder operations modulo the prime number p' with operations in an extension field of GF (p').

Figure 3:
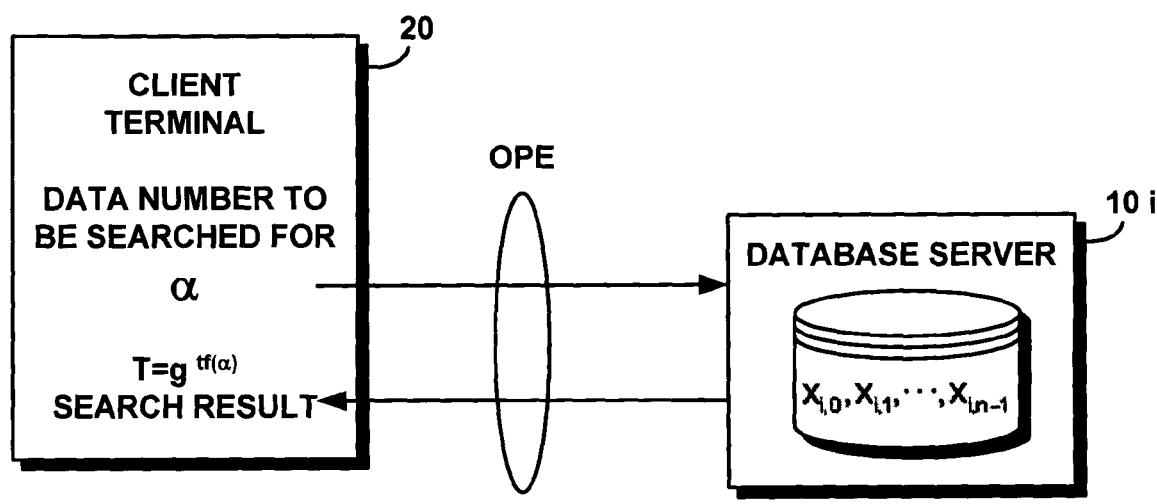
FIG. 3 is a block diagram illustrating the concept of a list search according to the database search system of FIGS. 1 and 2.

FIG. 3 describes the concept of the list search according to this embodiment. In this embodiment of the database searching system, this list search is performed by creating an nth-order polynomial $f_{Si}(x)$ and using OPE to compute $T_i$. The database server 10$i$ creates an nth-order polynomial $f_{Si}(x)$ having its data numbers $x_{i, 0}, \ldots, x_{i, n-1}$ as roots (that is, $f_{Si}(x_{i, j})$ where j=0, . . . , n−1).

To determine whether any database server 10$i$ has $\alpha \in L_i$), the client terminal 20 causes each database server 10$i$ in the server set S to use OPE and compute $T_i$, as follows:

$$T_i = g^{tfSi(\alpha)}.$$

where t is a non-zero and secret random number randomly generated by the database server 10$i$ for each response. Then, $\alpha$ is as follows:

$$T_i = g^{tfSi(\alpha)}$$

$$T_i = 1 \text{ then } \alpha \in L_i$$

$$T_i \neq 1 \text{ then } \alpha \notin L_i.$$

In the list search of this embodiment, when the client terminal 20 is to receive $g^{tfSi(\alpha)}$ from the database server 10$i$, the client terminal 20 wants to hide $\alpha$ from the database server 10$i$ (to protect the privacy of the search request). On the other hand, the database server 10$i$ wants to hide $g^{tfSi(\alpha')}$ ($\alpha' \neq \alpha$) from the client terminal 20 (to prevent providing excess information on the list). With this consideration, an evaluation problem suitable for a special form of OPE based on the DDH problem can be set.

Because of the nature of OPE, no information on $\alpha$ leaks to the database server 10$i$. Further, if $\alpha \in L_i$, then $T_i = 1$ irrespective of the value of t. Otherwise, $T_i$ will be a non-1 and random value with no correlation with each search request, because t is randomly chosen for each response. Therefore, the protocol for the list search according to this embodiment causes no leakage of information on the polynomial for any number of search requests executed (the number being expressed as a polynomial in the size of q, that is, infinite in practice).

The construction of the search request message generation algorithm G, the search response message generation algorithm R, and the search result determination algorithm D is described below.

In the initial state, the client terminal 20 exposes public keys $<g, e=g^d>$ corresponding to a private key $d \in Z_q$, and the server set S exposes the number n of the data items in the list.

Figure 4:
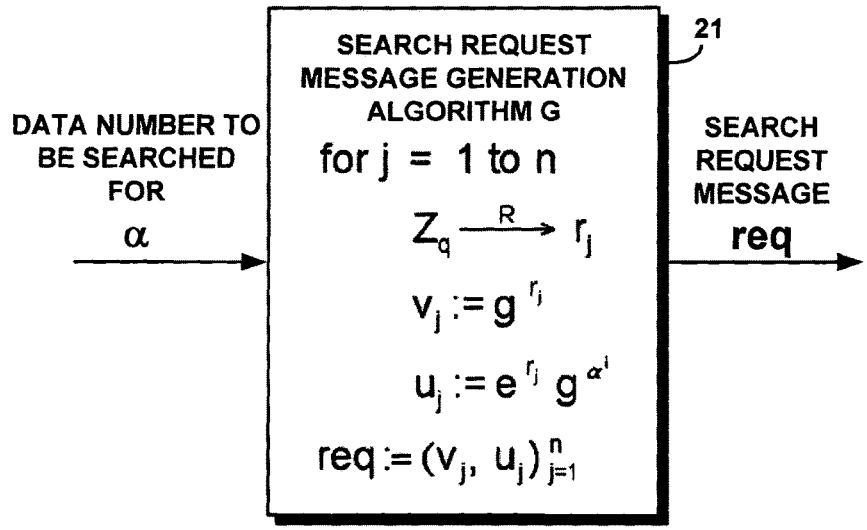
FIG. 4 is a diagram describing a search request message generation algorithm G according to the database search system of FIGS. 1 and 2.

FIG. 4 describes the search request message generation algorithm G. The algorithm G is executed in the search request message generation unit 21 of the client terminal 20. The algorithm G receives an input of the desired search target data number $\alpha$ and outputs the search request message req. In particular, it performs the following processing where $j=1, \ldots, n$.

Choose random $r_j (\in Z_q)$.
Compute $(v_j, u_j)$ with the public keys g and e:

$v_j = g^{r_j}$; and $u_j = e^{r_j} \cdot g^{\alpha j}$.

The search request message generation unit 21 outputs 2n values
$(v_1, u_1), \ldots, (v_n, u_n)$ computed in this manner as req. The output search request message req is sent to the n database servers 10$i$ via a network interface provided in the client terminal 20 as a transmission means and over the network.

Figure 5:
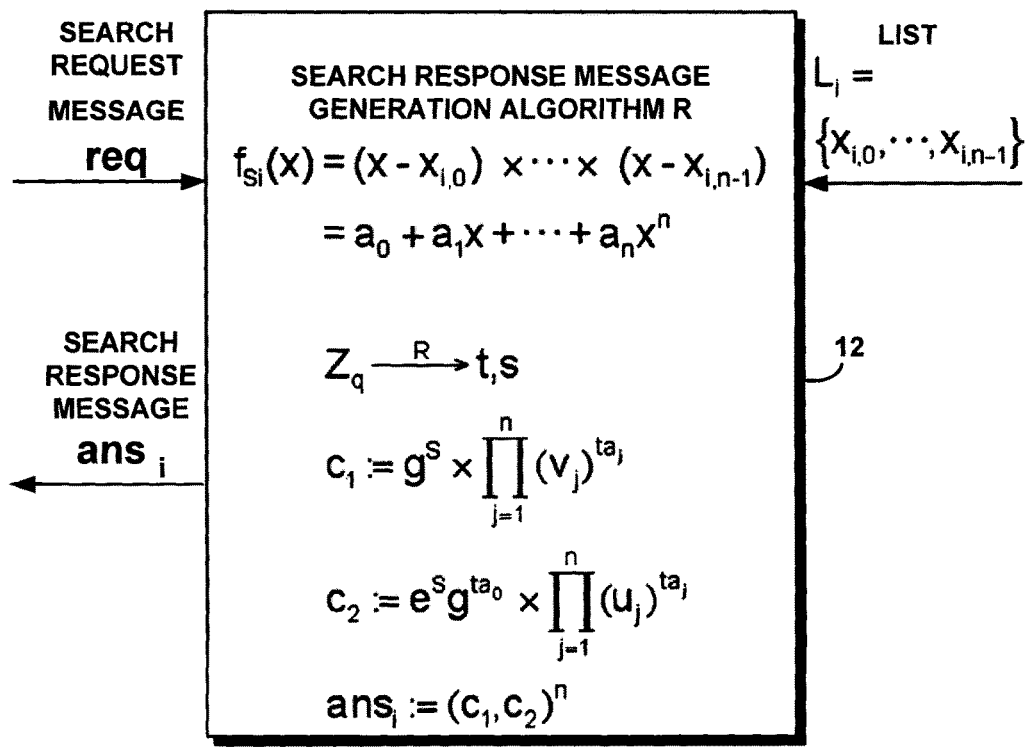
FIG. 5 is a diagram describing a search response message generation algorithm R according to the database search system of FIGS. 1 and 2.

FIG. 5 describes the search response message generation algorithm R. The algorithm R is executed in the search response message generation unit 12 of the database server 10$i$. The algorithm R receives an input of the search request message req and the list $L_i$ stored in the database 11, and outputs the search response message ans$_i$. In particular, it performs the following processing by OPE.

Obtain the following nth-order polynomial $f_{S_i}(x) = \Sigma_{j=0}^n a_j x^j \bmod q$ by expanding:

$$f_{S_i}(X) = \prod_{\gamma \in L_i} (x - \gamma) \bmod q$$

Choose random $t, s (\in Z_q)$.
Compute $c_1$ and $c_2$, as follows:

$$c_1 = g^s \times \prod_{j=1}^n (v_j)^{t a_j}$$

$$c_2 = e^s \times g^{t a_0} \prod_{j=1}^n (u_j)^{t a_j}$$

The two values $(c_1, c_2)$ computed in this manner are an evaluation result of OPE, and the search response message generation unit 12 outputs the two values as ans$_i$. The output search response message ans$_i$ is returned to the client terminal 20, which is the sender of the search request message req, via a network interface provided in the database server 10$i$ as transmission means and over the network.

Figure 6:
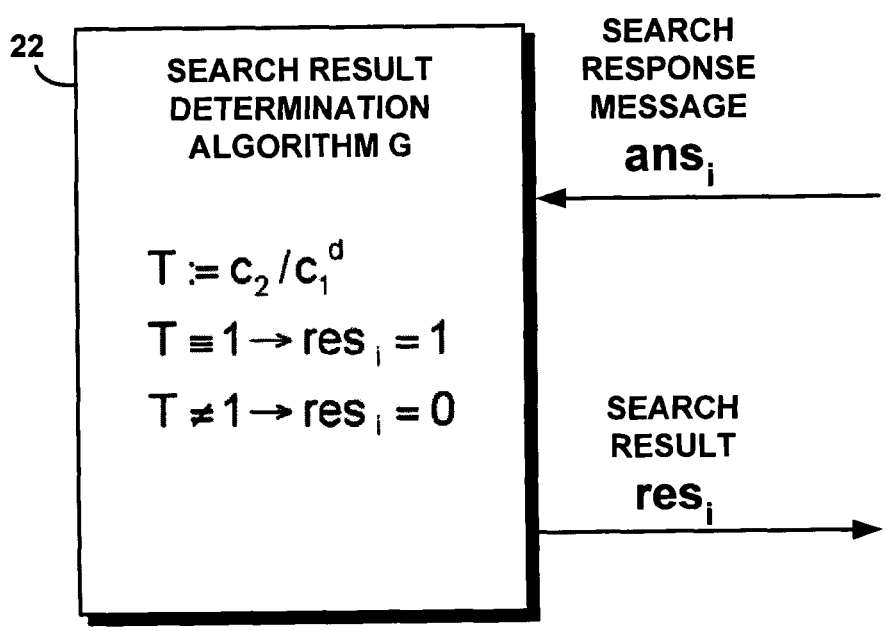
FIG. 6 is a diagram describing a search result determination algorithm D according to the database search system of FIGS. 1 and 2.

FIG. 6 describes the search result determination algorithm D. The algorithm is executed in the search result determination unit 22 of the client terminal 20. The algorithm D receives an input of the search response message ans$_i$ and outputs the search result res$_i$. In particular, it performs the following processing:

Obtain T with the private key d, as follows:

$$T = \frac{c_2}{c_1^d}$$

If $T=1$, then output 1 as res$_i$. If $T \neq 1$, then output 0 as res$_i$.

From the output search result res$_i$, the client using the client terminal 20 can know which database server 10$i$ has the desired data. Then, the client may make another request for the desired data from that database server 10$i$ having the desired data.

Database systems to which this embodiment can be applied might be a skill database, a distributed database, a treatise database, or a peer-to-peer database, for example.

A database of personal skills can be used to share information among people and to communicate between persons. This may be called an electronic-information version of business card exchange. Here, for smooth database operation, providing excess information is undesirable because a personal skill is private information on the person. For a human resource database of a temporary agency, a person with a particular skill may be extracted from the database. Then, providing information on all skills would reveal important secrets of the agency, which would be a problem.

In this example, the skills stored in the database may be arranged in a list with their data numbers, and a management server for the database may be the database server 10$i$ of this embodiment. A terminal device corresponding to the client terminal 20 may issue a search request while hiding the data number of a desired skill. The database server 10$i$ then cannot know which skill (data item) the client terminal 20 has targeted by the search. The client terminal 20 also cannot know what kinds of skills the database server 10$i$ stores as its data besides the requested skill. Consequently, database management with protected privacy is possible.

In recent years, home electric appliances with connection to an external network such as the Internet have been increasing. Among others, an idea that is becoming practical is recording a broadcast program into a hard disk and sharing recorded data with others over the network to create a distributed database. Here, a client who wants to obtain recorded data has to search for the recorded data stored in the hard disk connected to the network. However, the client wants to keep secret the program targeted by the search because it is private information. It is further desired to hide a list of recorded data stored in the hard disk for privacy reasons.

In this case, a unique data number may be applied to each recorded data item stored in the hard disk, and the host computer of the hard disk may be the database server 10$i$ of the database search system. A terminal device corresponding to the client terminal 20 may issue a search request while hiding the data number of the desired recorded data. The database server 10$i$ then cannot know what kind of recorded data (data item) the client terminal 20 has targeted with the search request. The client terminal 20 also cannot know what kinds of recorded data the database server 10$i$ stores other than the requested recorded data. Consequently, database management with protected privacy is possible.

In addition, some databases of this kind charge for data searches. For proper charging, the amount of a search result obtained in one search is limited. According to this embodiment, the client can obtain no information on data other than the data for which the search request is issued. Consequently, proper management of such paid systems is possible.

As computerized submission of treatises is increasing, many websites on the Internet provide lists of treatises belonging to the websites. However, due to copyright restrictions on the treatises, it may be undesirable to post treatise data itself in an open database. On the other hand, providing a treatise from a person to a person is often possible. Therefore, it is desired to hide a list of distributable treatises. On the other hand, a person searching the treatises will have a breach of privacy if the kind of treatise the person is targeting with their search is widely known.

In this case, the treatises stored in the database may be arranged in a list with their data numbers (treatise numbers), and a management server for the database may be the database server 10*i* of this embodiment of the database search system. A terminal device corresponding to the client terminal 20 may issue a search request while hiding the data number of a desired treatise.

The database server 10*i* then cannot know what kind of treatise (data item) the client terminal 20 is targeting with the search request. The client terminal 20 also cannot know what kinds of treatises the database server 10*i* stores as its data besides the requested treatise. Consequently, the treatise may be provided to the searching person while the database server 10*i* hides the treatise list and the searching person.

In recent years, there has been an explosive spread of use of databases employing peer-to-peer (P2P) network techniques. In a peer-to-peer network, each of an unspecific number of peers having different data shares the data with other peers and constructs a huge database as a whole. In searching this database, the database search according to this embodiment may be used to find out where desired data is located.

Specifically, a peer that searches the database may be the client terminal 20, and the other peers on the network may be the database servers 10*i* of this embodiment. The peer corresponding to the client terminal 20 broadcasts to the other peers a search request in which a desired data is kept secret. According to the method of this embodiment, a common search request may be used irrespective of the number of the database servers 10*i* (the size of the search request is independent of the number of the database servers 10*i*). This is advantageous for a database search of this kind.

With this embodiment, it is possible to hide the data item involved with the search request, as well as the list of the data items in the database to be searched. This may contribute to a sound development of a database utilizing a peer-to-peer network.

As described above, the database search system can ensure the privacy of a search request and the security of a database with high processing efficiency.

It is to be understood that the specific embodiments of the invention that have been described are merely illustrative of certain application of the principle of the present invention. Numerous modifications may be made to the system and method for searching a database or data sharing system for existence of data invention described herein without departing from the spirit and scope of the present invention.

What is claimed is:

1. A method, comprising:
    searching, by a client, for a desired data item in a database server, wherein the database server has a list of data items, by:
        sending, from the client to the database server, a search request message generated using a first algorithm and based on an encryption of the desired data item;
        receiving, at the client from the database server, a search response message, wherein the search response message is generated using a second algorithm, based on the search request message, and based on the list of data items in the database server, and wherein the search response message comprises a pair of values; and
        determining, at the client, that the desired data item is in the database server using a third algorithm and based on the pair of values in the search response message, wherein the third algorithm uses a private key applied to a value of the pair of values; and
    requesting, from the client, the desired data item from the database server.

2. The method of claim 1, wherein the desired data item is encrypted using a public key.

3. A system, the system comprising:
    a central processing unit;
    a storage medium coupled to the central processing unit, wherein the storage medium stores a program for:
        searching, by a client, for a desired data item in a database server, wherein the database server has a list of data items, by:
            sending, from the client to the database server, a search request message generated using a first algorithm and based on an encryption of the desired data item;
            receiving, at the client from the database server, a search response message, wherein the search response message is generated using a second algorithm, based on the search request message, and based on the list of data items in the database server, and wherein the search response message comprises a pair of values; and
            determining, at the client, that the desired data item is in the database server using a third algorithm and based on the pair of values in the search response message, wherein the third algorithm uses a private key applied to a value of the pair of values; and
        requesting, from the client, the desired data item from the database server.

4. The system of claim 3, wherein the desired data item is encrypted using a public key.

5. A computer program product, the computer program product comprising a non-transitory storage medium storing a program, the program executable by a central processing unit to perform:
    searching, by a client for a desired data item in a database server, wherein the database server has a list of data items, by:
        sending, from the client to the database server, a search request message generated using a first algorithm and based on an encryption of the desired data item;
        receiving, at the client from the database server, a search response message, wherein the search response message is generated using a second algorithm, based on the search request message, and based on the list of data items in the database server, and wherein the search response message comprises a pair of values; and
        determining, at the client, that the desired data item is in the database server using a third algorithm and based on the pair of values in the search response message, wherein the third algorithm uses a private key applied to a value of the pair of values; and
    requesting, from the client, the desired data item from the database server.

6. The computer program product of claim 5, wherein the desired data item is encrypted using a public key.

7. The method of claim 1, wherein the database server is from a plurality of database servers.

8. The system of claim 3, wherein the database server is from a plurality of database servers.

9. The computer program product of claim 5, wherein the database server is from a plurality of database servers.

\* \* \* \* \*